United States Patent
Lin et al.

(10) Patent No.: US 8,666,618 B2
(45) Date of Patent: Mar. 4, 2014

(54) MACHINE CONTROL SYSTEM IMPLEMENTING APPLICATION-BASED CLUTCH MODULATION

(75) Inventors: Hong-Chin Lin, Glenview, IL (US); Rami Nabil Nasrallah, Green Valley, AZ (US)

(73) Assignee: Caterpillar Inc., Peoria, IL (US)

(*) Notice: Subject to any disclaimer, the term of this patent is extended or adjusted under 35 U.S.C. 154(b) by 857 days.

(21) Appl. No.: 12/289,694

(22) Filed: Oct. 31, 2008

(65) Prior Publication Data

US 2010/0114440 A1    May 6, 2010

(51) Int. Cl.
*G06G 7/00* (2006.01)

(52) U.S. Cl.
USPC ........ 701/54; 701/1; 701/50; 701/59; 701/67; 477/5; 477/6; 477/174

(58) Field of Classification Search
USPC .............. 701/1, 50, 67, 59, 54; 477/5, 6, 174
See application file for complete search history.

(56) References Cited

U.S. PATENT DOCUMENTS

| | | |
|---|---|---|
| 3,750,762 A | 8/1973 | Eaton |
| 4,976,331 A | 12/1990 | Noerens |
| 5,029,087 A | 7/1991 | Cowan et al. |
| 5,040,648 A | 8/1991 | Mitchell et al. |
| 5,065,319 A | 11/1991 | Iwatsuki et al. |
| 5,265,705 A | 11/1993 | Takasugi et al. |
| 5,509,520 A | 4/1996 | Evans et al. |
| 5,613,581 A * | 3/1997 | Fonkalsrud et al. ......... 192/3.23 |
| 5,720,358 A * | 2/1998 | Christensen et al. ........ 180/53.4 |
| 5,743,366 A | 4/1998 | Stoever et al. |
| 5,895,435 A * | 4/1999 | Ohta et al. ...................... 701/59 |
| 5,947,242 A | 9/1999 | Creger |
| 6,162,146 A | 12/2000 | Hoefling |
| 6,186,198 B1 | 2/2001 | Holmes |
| 6,211,471 B1 * | 4/2001 | Rocke et al. ................... 177/136 |
| 6,234,254 B1 * | 5/2001 | Dietz et al. ......................... 172/3 |
| 6,405,844 B1 | 6/2002 | Takamatsu |
| 6,619,451 B2 | 9/2003 | Hrazdera |
| 7,146,263 B2 * | 12/2006 | Guven et al. .................... 701/54 |
| 2003/0093205 A1 * | 5/2003 | Carlson et al. .................. 701/53 |
| 2003/0225500 A1 | 12/2003 | Bergqvist et al. |
| 2005/0250618 A1 * | 11/2005 | Colvin et al. ................. 477/174 |
| 2006/0245896 A1 * | 11/2006 | Alshaer et al. ............... 414/685 |
| 2007/0010927 A1 | 1/2007 | Rowley et al. |
| 2008/0076635 A1 * | 3/2008 | Lee et al. ...................... 477/180 |

* cited by examiner

*Primary Examiner* — James Trammell
*Assistant Examiner* — Truc M Do
(74) *Attorney, Agent, or Firm* — Finnegan, Henderson, Farabow, Garrett & Dunner LLP

(57) ABSTRACT

A machine control system for use with a machine having a power source and a transmission is disclosed. The machine control system may have a clutch configured to connect an output of the power source with an input of the transmission. The machine control system may also have a sensors configured to generate signals indicative of machine operations, and a controller in communication with the clutch and the sensors. The controller may be configured to determine the current machine application based on the signals, and vary an actuating force of the clutch based on the type of machine application.

18 Claims, 3 Drawing Sheets

MACHINE CONTROL SYSTEM IMPLEMENTING APPLICATION-BASED CLUTCH MODULATION

TECHNICAL FIELD

The present disclosure relates generally to a machine control system and, more particularly, to a machine control system that implements application-based clutch modulation.

BACKGROUND

Machines, including wheel loaders, motor graders, and other types of heavy machinery generally include a multi-speed, bidirectional, mechanical transmission drivingly coupled to an engine by way of a torque converter assembly. The torque converter is a fluid coupling that multiplies and/or absorbs torque fluctuations transmitted between the engine and the traction devices of the machine by allowing slippage between an output shaft of the engine and an input shaft of the transmission. The torque converter assembly includes an impeller clutch to allow the operator a degree of freedom in determining the slippage between the output shaft of the engine and the input shaft of the torque converter (i.e., the impeller). The impeller clutch allows for high engine speeds while limiting the amount of torque that is transmitted into the torque converter, thus allowing some of the torque to be directed for other purposes.

As an operator depresses an impeller clutch pedal, the force keeping the impeller clutch engaged is proportionally reduced. As the force decreases, the clutch may begin to slip and less torque is transmitted from the engine to the torque converter. The amount of force applied to the clutch is selected such that, when the clutch pedal is depressed, the torque generated by the engine is modulated for only one machine application condition, such as digging, as it is passed to the torque converter.

Although efficient for applications requiring high torque, the modulation of the force applied to the clutch as the pedal is depressed may be sub-optimal during applications that require low torque, such as truck loading. That is, during applications requiring high torque, such as digging, the clutch pedal offers a higher resolution for operator control. However, due to the preset modulation for higher torque, modulation of the transmitted torque is not refined enough for applications requiring low torque.

One system focused on improved torque transfer during different operations is disclosed in U.S. Pat. No. 5,720,358 (the '358 patent) issued to Christensen et al. on Feb. 24, 1998. The '358 patent discloses an electric control device for a drive train of a machine including an engine, a transmission, a torque converter, and an impeller clutch. A manually operated impeller clutch pedal produces an impeller clutch pedal signal in response to the position of the impeller clutch pedal. An impeller clutch electro-hydraulic valve produces fluid flow to the impeller clutch to controllably engage and disengage the impeller clutch. An impeller clutch pressure curve that is responsive to the impeller clutch pedal position is stored in memory, where an electronic controller selects an impeller clutch engine speed. An electronic controller can also determine if a machine is digging. An electronic controller receives the signal that the machine is digging and selects a desired torque converter engine speed. The torque converter engine speed is a desired engine speed that corresponds to a desired maximum torque. This allows the machine to control the maximum torque during digging conditions. Further, the electronic controller modulates the torque through receiving signals based on pressures from the hydraulic cylinders, speed from the torque converter, and speed of the engine Although the device of the '358 patent may improve control over the impeller clutch, it may still be sub-optimal. That is, the control over the engine speed is only for digging applications. The system still has some delays associated with operation of the machine during applications that require different amounts of torque and slip. As such, the modulation of the torque during different applications is not sufficiently refined.

The disclosed control system is directed to one or more improvements in the existing technology.

SUMMARY

In one aspect, the present disclosure is directed to a machine control system for use with a machine having a power source and a transmission. The machine control system may include a clutch configured to connect an output of the power source with an input of the transmission. The machine control system may also include a plurality of sensors configured to generate signals indicative of current operations of the machine, and a controller in communication with the clutch and the sensors. The controller may be configured to determine a current machine application based on the signals and vary an actuation force of the clutch based on the current machine application.

In another aspect, the present disclosure is directed to a method of operating a machine. The method may include generating power, engaging a coupling to transmit the power to propel the machine, and determining a current application of a machine. The method may also include varying the engagement of the coupling based on the current machine application.

DETAILED DESCRIPTION

Figure 1:
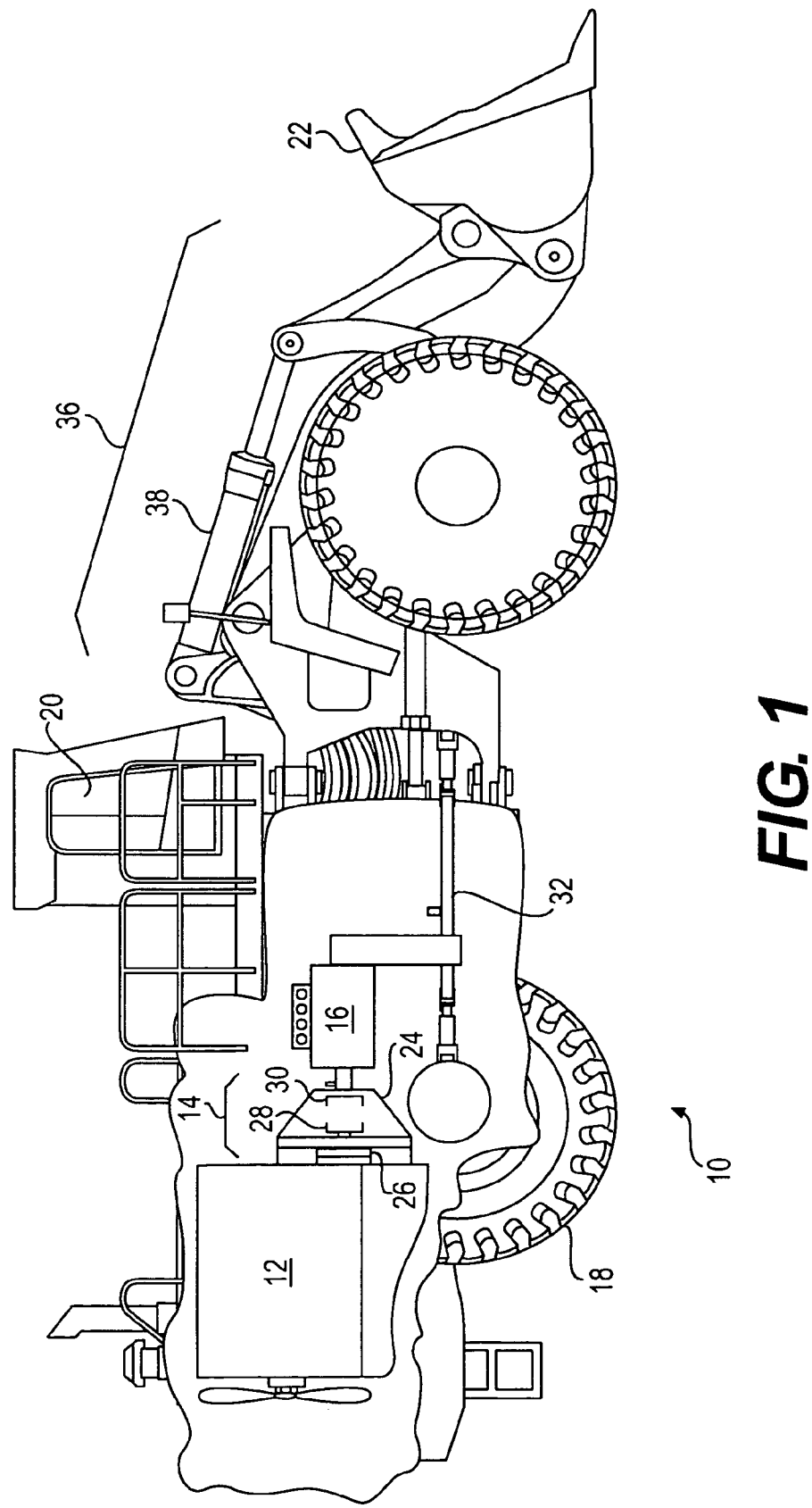
FIG. 1 is a diagrammatic illustration of an exemplary disclosed machine.

FIG. 1 illustrates an exemplary machine 10. Machine 10 may embody a mobile machine that performs some type of operation associated with an industry such as mining, construction, farming, transportation, or any other industry known in the art. For example, machine 10 may be an earth-moving or material-handling machine such as a wheel loader, a motor grader, or any other suitable earth moving machine. Machine 10 may include, among other things, a power source 12, a torque converter assembly 14, a transmission 16 operatively connected between the torque converter assembly 14 and a traction device 18, an operator station 20, and a machine tool 22.

Power source 12 may produce a power output having both torque and rotational speed components (i.e., Power=Torque×Speed, wherein Speed may be a rotational speed, for example, of a shaft), and may embody an internal combustion engine. For example, power source 12 may embody a diesel engine, a gasoline engine, a gaseous fuelpowered engine, or any other engine apparent to one skilled in the art. Power source 12 may contain an engine block having a plurality of cylinders (not shown), reciprocating pistons disposed within the cylinders (not shown), and a crankshaft operatively connected to the pistons (not shown). The internal combustion engine may use a combustion cycle to convert potential energy (usually in chemical form) to a rotational output of the crankshaft, which may in turn rotate an input of torque converter assembly 14.

Torque converter assembly 14 may be used to transmit torque from power source 12 to transmission 16. Torque converter assembly 14 may include a torque converter 24 and an impeller clutch 26. Torque converter 24 may be a hydro-mechanical device configured to transmit torque from power source 12 to transmission 16. Torque converter 24 may allow power source 12 to rotate somewhat independently of transmission 16. For example, torque converter 24 may contain an impeller 28 and a turbine 30. Impeller 28 may be connected to an output of impeller clutch 26. It is also contemplated that impeller 28 may alternatively be directly connected to power source 12 (i.e., directly connected to the crankshaft of power source 12), and another clutch may be located on an output side of torque converter 24, if desired. For example, a first clutch of transmission 16 (not shown) may perform a function similar to that performed by impeller clutch 26.

Impeller 28 may rotate as a result of power source operation (dependent on the degree of impeller clutch engagement). This rotation of impeller 28 may thus impart momentum to fluid within torque converter 24. Turbine 30, connected to transmission 16, may receive this momentum, thus causing turbine 30 and connected transmission 16 to rotate. At low fluid flow rates and pressures, impeller 28 may rotate at a higher speed relative to turbine 30. However, as the pressure and the flow rate of the fluid conducted between impeller 28 and turbine 30 increase, the rotational speed of turbine 30 may approach the rotational speed of impeller 28.

Impeller clutch 26 may allow variable engagement between power source 12 and transmission 16. Specifically, impeller clutch 26 may allow power source 12 to rotate at a relatively high speed and high torque, while allowing transmission 16 to rotate at a lower speed and/or with reduced torque. Impeller clutch 26 may embody a disc-type clutch located between the output of power source 12 and the input of torque converter 24. Impeller clutch 26 may contain an input disk and an output disk. The input disk may be connected to power source 12 and may rotate as a result of power source operation. The output disk may be oriented substantially coaxially relative to the input disk and may be connected to the input of torque converter 24. The input disk and the output disk of impeller clutch 26 may be selectively engaged by a hydraulic and/or mechanical actuator that axially presses the disks together, thus allowing frictional forces to couple the rotation of the input disk to the rotation of the output disk or vice versa. The magnitude of the pressure applied to the impeller clutch disks may be related to the magnitude of the frictional forces and, subsequently, to the magnitude of the torque transmitted between power source 12 and transmission 16. Impeller clutch 26 may reduce the coupling of power source 12 to transmission 16 by decreasing the degree of frictional engagement between the input disk and the output disk, thus allowing the disks to rotate more freely relative to each other. Similarly, impeller clutch 26 may increase the coupling of power source 12 to transmission 16 by increasing the degree of frictional engagement between the input disk and the output disk (i.e., by increasing the pressure forcing the disks together). It is contemplated that impeller clutch 26 may be activated manually, as will be described below, or automatically via a controller (not shown). Impeller clutch 26 may generate a signal indicative of its degree of engagement.

Transmission 16 may include numerous components that interact to transmit power from power source 12 to traction device 18. In particular, transmission 16 may embody a multi-speed, bidirectional, mechanical transmission having a neutral position, a plurality of forward gear ratios, one or more reverse gear ratios, and one or more clutches (not shown) for selectively engaging predetermined combinations of gears (not shown) that produce a desired output gear ratio. Transmission 16 may be an automatic-type transmission, wherein shifting is based on a power source speed, a maximum operator selected gear ratio, and a shift map stored within a transmission controller. Alternatively, transmission 16 may be a manual transmission, wherein the operator manually engages the actual gear combinations. The output of transmission 16 may be connected to rotatably drive traction device 18 via a shaft 32, thereby propelling machine 10. It is contemplated that transmission 16 may alternatively include only a single gear combination or no gear combinations at all, if desired, such as in a continuously variable or parallel path type of transmission.

Traction device 18 may include wheels located on each side of machine 10 (only one side shown). Alternately, traction device 18 may include tracks, belts, or other driven traction devices. Traction device 18 may be driven by transmission 16 to rotate in accordance with an output rotation of transmission 16.

Figure 2:
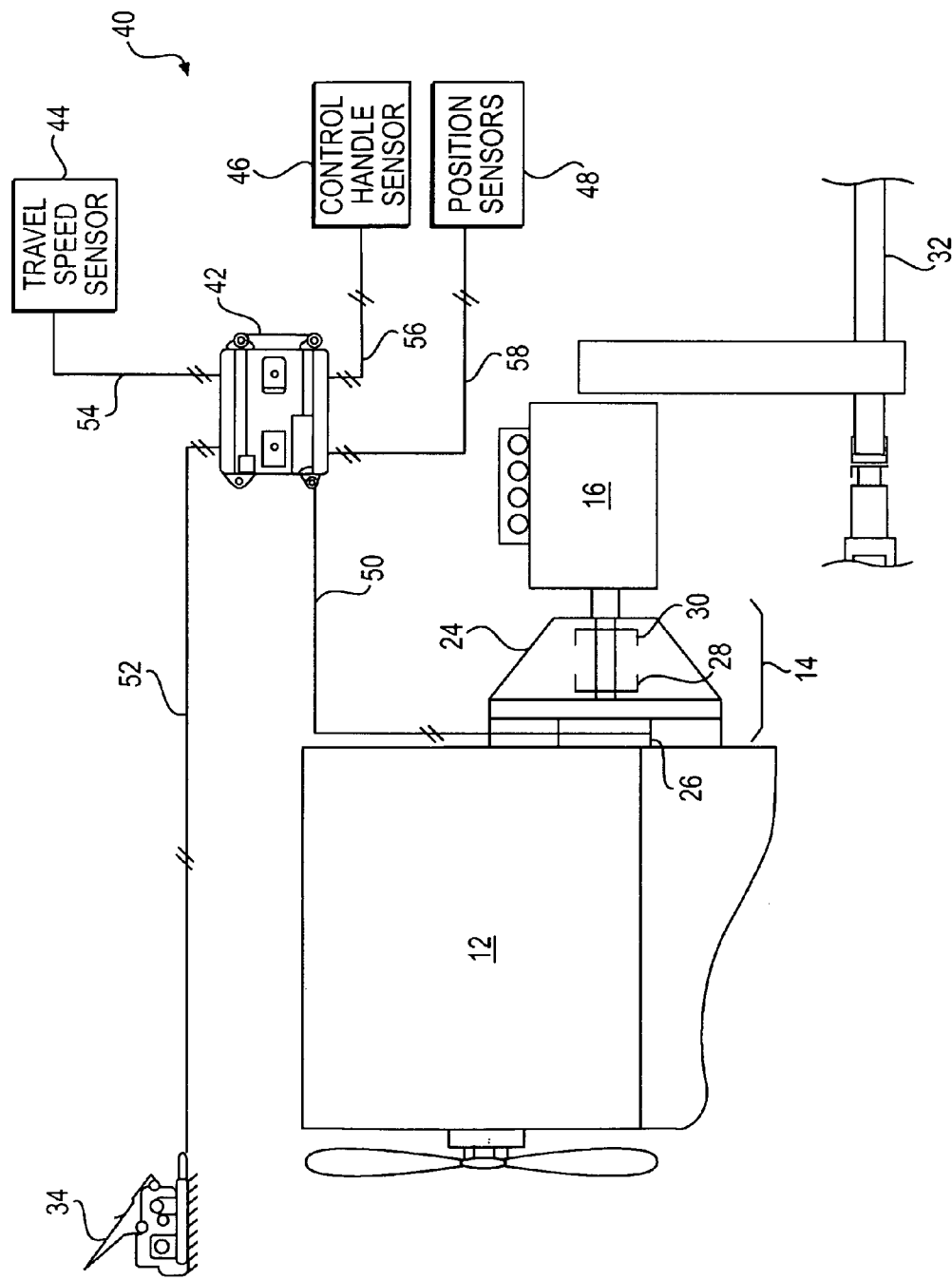
FIG. 2 is a diagrammatic illustration of an exemplary disclosed control system that may be used with the machine of FIG. 1.

Operator station 20 may include one or more operator interface devices, e.g., an operator input device. The operator interface devices may be located proximal an operator seat and embody, for example, a pedal, a single or multi-axis joysticks, wheels, knobs, push-pull devices, switches, and other operator interface devices known in the art. As shown in FIG. 2, one such interface device may include an impeller clutch pedal 34.

Impeller clutch pedal 34 may be manually actuated to allow variable control of impeller clutch 26 and of a friction type brake mechanism (not shown). The degree of impeller clutch pedal actuation may be related to a degree of coupling engagement between power source 12 and transmission 16 affected by impeller clutch 26, as will be described in more detail below. Impeller clutch pedal 34 may be movable through a range of motion from a neutral position to a maximum displaced position. As impeller clutch pedal 34 is displaced away from the neutral position, a signal indicative of the displaced position may be generated. In some embodiments, the displaced position may be related to an operator desired reduction in the amount of torque transmitted from power source 12 to transmission 16.

The impeller clutch pedal range of motion may be divided into different portions. For example, some portion of the impeller clutch pedal range of motion (e.g., about the first 6%) may be considered a deadband portion. When displaced to a position within the deadband, movement of impeller clutch pedal 34 may have little effect on impeller clutch operation. That is, when in the neutral position or displaced within the first 6% of its range of motion, impeller clutch pedal 34 may signal for impeller clutch 26 to remain fully engaged. Similarly, some portion of the impeller clutch pedal range of motion (e.g., about the last 50%) may be used to actuate the brake mechanism. As the operator depresses impeller clutch pedal 34, impeller clutch 26 may disengage until it is almost fully disengaged at around 50% of the travel of impeller clutch pedal 34. And, if the operator continues to depress impeller clutch pedal 34 through the remaining 50% of the range of motion, the brake mechanism may become engaged and engage to an increasing degree as the impeller clutch pedal is depressed further. In some embodiments, the brake mechanism may engage as soon as at about 40% of the impeller clutch pedal travel. It is contemplated that impeller clutch pedal 34 may embody a mechanical device, an electrical device, a hydraulic device, or any other type of device known in the art.

The machine tool 22 may be a bucket as shown in FIG. 1, but this is just one example of a machine tool. In FIG. 1, the machine tool 22 includes a bucket that is connected to a lift arm assembly or linkage 36 that is pivotally actuated by hydraulic lift cylinders (not shown) attached to the machine. The bucket may also be tilted or racked by hydraulic tilt cylinders 38.

As illustrated in FIG. 2, machine 10 may also include a control system 40 having components that cooperate to regulate operation of torque converter assembly 14. In particular, control system 40 may include a controller 42 in communication with impeller clutch 26, impeller clutch pedal 34, and a plurality of sensors to control the operation of the power train. In response to input received from impeller clutch pedal 34 and the plurality of sensors, controller 42 may engage, disengage, and vary the degree of engagement of impeller clutch 26.

The controller 42 receives several signals pertaining to the operation of the power train. A travel speed sensor 44 produces a machine travel speed signal that is responsive to the transmission output speed. An operator control handle is included in the operator station 20 for selectively controlling the operation of the transmission 16. The control handle includes a control handle sensor 46 which generates transmission control signals to the controller 42 that are indicative of a desired gear ratio and/or direction of the machine.

The controller 42 also receives position signals produced by position sensors 48 that measure the position of the machine tool 22. For example, the position sensors 48 may include displacement sensors that sense the amount of cylinder extension in the hydraulic lift cylinders (not shown) and the hydraulic tilt cylinders 38. The machine tool 22 position may also be derivable from machine tool 22 joint angle measurements. Thus, an alternative device for producing a machine tool position signal includes rotational angles sensors such as rotatory potentiometers. The machine tool 22 position may be computed from either the hydraulic cylinder extension measurements or the joint angle measurement by trigonometric methods.

Controller 42 may communicate with impeller clutch 26 via a communication line 50, with impeller clutch pedal 34 via a communication line 52, with travel speed sensor 44 via communication line 54, with control handle sensor 46 via communication line 56, and with position sensors 48 via communication line 58.

Controller 42 may embody a single microprocessor or multiple microprocessors that include a means for receiving input from and providing output to control system 40. Numerous commercially available microprocessors may be configured to perform the functions of controller 42. It should be appreciated that controller 42 may readily embody a general machine microprocessor capable of controlling numerous machine functions. Various other circuits may be associated with controller 42, such as power supply circuitry, signal conditioning circuitry, data acquisition circuitry, signal output circuitry, signal amplification circuitry, and other types of circuitry known in the art.

It is also considered that controller 42 may include one or more maps stored within an internal memory of controller 42 and that controller 42 may reference these maps during the regulation of impeller clutch 26. Each of these maps may include a collection of data in the form of tables, graphs, and/or equations. For example, one map may relate the machine application, as determined by the controller 42, and a displacement position of impeller clutch pedal 34 to an activation pressure or force of impeller clutch 26 that results in an operator desired amount of torque being transferred from power source 12 to transmission 16.

Controller 42 may use any control method known in the art to regulate operation of impeller clutch 26 such as, for example, bang-bang control, proportional control, proportional integral derivative control, adaptive control, model-based control, or logic-based control. Controller 42 may use either feedforward or feedback control.

Controller 42 may also include a digital filter (not shown). The digital filter contains formulas to perform mathematical operations on the data received from the multiple sensors in order to filter out extremes in the data. The digital filter on the controller 42 allows the controller to process the signals received from the multiple sensors. The digital filter rejects signals that fall outside of a prescribed threshold. The use of the digital filter allows the controller 42 to smoothly control the transition between machine applications.

Figure 3:
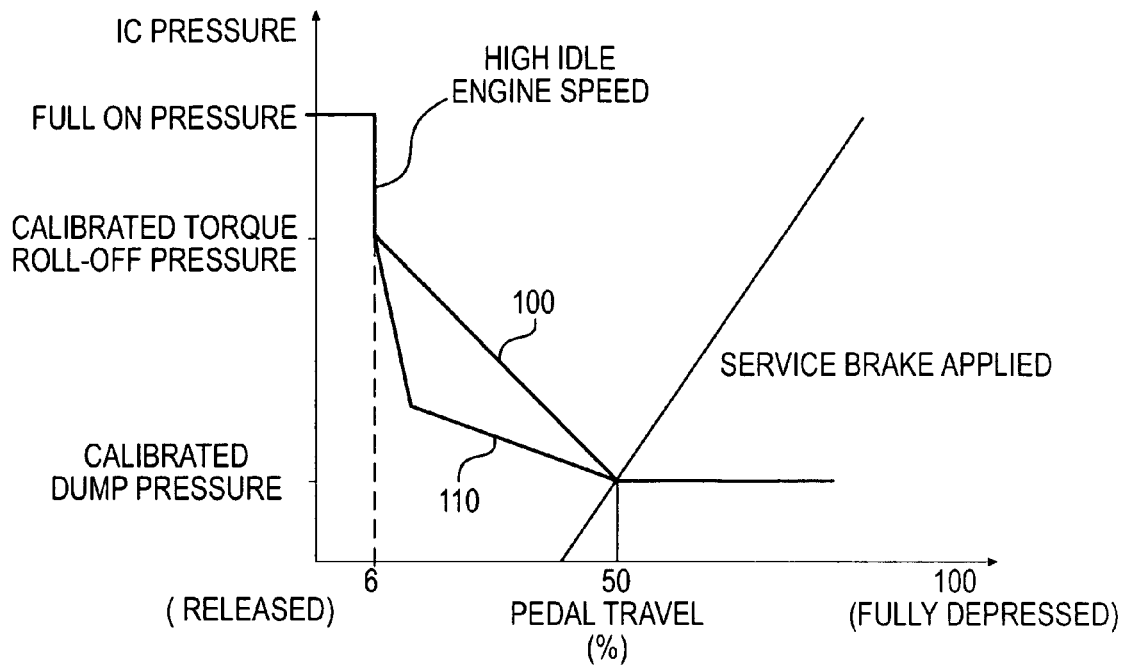
FIG. 3 is an exemplary performance curve associated with the machine of FIG. 1.
Figure 4:
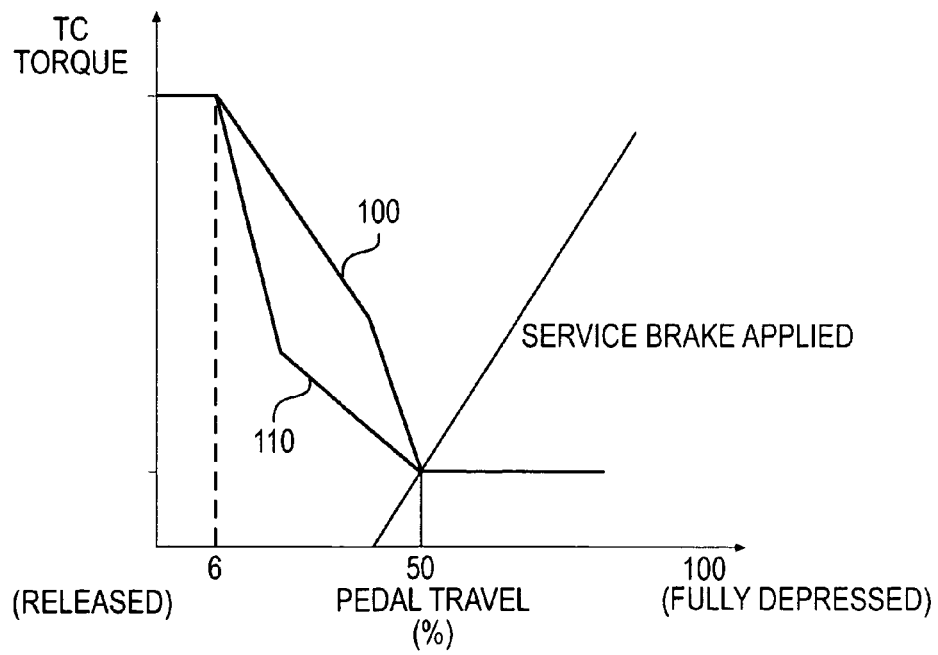
FIG. 4 is another exemplary performance curve associated with the machine of FIG. 1.

FIGS. 3 and 4 outline exemplary operations of control system 40. These figures will be discussed in detail below.

INDUSTRIAL APPLICABILITY

The presently disclosed control system may be applicable to any machine having an impeller clutch where responsiveness thereof affects performance of the machine. The disclosed system may improve responsiveness of the impeller clutch by controlling a rimpull pressure based on specific machine applications during modulation. By controlling the rimpull pressure based on the machine application, this allows for better torque modulation during different applications, such as digging and non-digging. The operation of machine 10 will be described below.

During operation of machine 10, an operator may set the speed of power source 12, for example, to high idle and engage a desired combination of gears within transmission 16 to initiate travel. As machine 10 is propelled, torque may be transferred from power source 12 through engaged impeller clutch 26, from impeller 28 to turbine 30, and through the gearing of transmission 16 to traction devices 18 (referring to FIG. 1). In some situations, the operator may desire less torque to be transferred from power source 12 to traction devices 18. For example, when digging into a pile of earthen material, traction devices 18 may begin to spin under a high torque output. To minimize wheel slippage or spin during digging, the operator may depress impeller clutch pedal 34 to control the rimpull torque of machine 10 (i.e., to reduce the amount of torque at the wheels). Also, once into the pile of earthen material, the operator may desire to lift the machine tool 22 located on the machine 10 that is loaded with the material. To increase the lift capacity or lift speed, the operator may desire to transfer torque from traction devices 18 to a hydraulic circuit associated with the machine tool 22. Again, to accomplish this transfer of torque, the operator may depress impeller clutch pedal 34.

With reference to FIGS. 3 and 4, an uppermost curve 100 may represent the situation described above, where machine 10 is operating at a set speed while performing a digging application. Curve 100 is selected by the controller 42 when the controller 42 receives signals from the multiple sensors indicating the machine is performing a digging application.

The digging application is determined by the controller 42 if three conditions occur: the operator has selected the first gear forward shift position, the machine tool 22 is in a digging position; and the machine travel speed is less than a predetermined speed. The travel speed sensor 44 communicates with controller 42 to indicate the travel speed of the machine 10. The control handle sensor 46 communicates with controller 42 to indicate both the transmission gearing and the direction of the machine 10, for example, forward or reverse. The controller 42 communicates with the multiple position sensors 48. One method for determining whether the machine tool 22 is in a digging position is by measuring the hydraulic lift cylinder position using one of the position sensors 48. For example, if the machine tool 22 is at a position less than or equal to a horizontal reference line, then the machine tool 22 is considered to be in a digging position. The horizontal reference line is a preset limit defined by a preset location of the machine tool 22. Controller 42 determines if the conditions for a digging application have occurred, then selects curve 100 if the controller indicates the machine 10 is performing a digging application. Based on curve 100, during digging applications the controller 42 communicates with the transmission 16 to change the rimpull based on the torque desired by curve 100 and the impeller clutch pedal 34 travel (referring to FIGS. 3 and 4).

As can be seen from curve 100, before impeller clutch pedal 34 is depressed, the actuating pressure of impeller clutch 26 may be at a maximum value (referring to FIG. 3), the Full-on pressure. In this state, slip of impeller clutch 26 may be minimized and substantially all of the torque produced by power source 12 and transmitted to impeller clutch 26 may be transferred to traction devices 18 (referring to FIG. 4). As impeller clutch pedal 34 is depressed through the deadband (e.g. through the first 6% of its range of motion), little change in the actuating pressure can be observed (FIG. 3). However, as the position of impeller clutch pedal 34 reaches the displaced boundary of the deadband, the actuating pressure of impeller clutch 26 may quickly drop from the Full-on pressure to a Roll-off pressure specific to the current speed of power source 12. At the Roll-off pressure, slippage of impeller clutch 26 should still be substantially inhibited and the torque transferred to traction devices 18 substantially unchanged (FIG. 4).

As impeller clutch pedal 34 is depressed past the displaced boundary of the deadband, a reduction in the torque transmitted through to traction devices 18 may be experienced. That is, as impeller clutch pedal 34 is depressed further from about the 6% displaced position to the maximum displaced position, the actuating pressure of impeller clutch 26 may be reduced between the Roll-off pressure and a Dump pressure at a rate corresponding to the current displacement position of impeller clutch pedal 34 (FIG. 3). In one example, the relationship between impeller clutch pedal position and the change in actuating pressure may be substantially linear during the digging application. As shown in FIG. 4, in the high torque range on curve 100 there is a gradual change in torque (slope). This allows for the operator to have more control over the modulation of the torque transmitted to the traction devices 18 in the high torque range during the digging application. The maximum torque reduction may be experienced at about 50% travel of impeller clutch pedal 34 (FIG. 4). As impeller clutch pedal 34 is depressed past the 50% displacement position the pressure may be reduced further to the Dump pressure and the brake mechanism may be activated. The Dump pressure may be a minimum allowable pressure that, when combined with brake pressure, may help ensure machine 10 is inhibited from rolling freely (i.e., some positive torque may always be transferred to traction devices 18 when transmission 16 is engaged). The Dump pressure may also keep impeller clutch 26 full of pressurized fluid for quick activation when commanded.

When the machine 10 is performing a non-digging application, such as loading, the machine requires more control over the modulation of impeller clutch torque within the low torque range, just before getting into a braking zone (referring to FIG. 4). As described above, the operator may desire different torque amounts to be transferred from power source 12 to traction devices 18. In a non-digging application, the machine 10 may require less torque than digging. Thus, lower pressure would be applied to the impeller clutch 26. To improve responsiveness and provide better modulation, the rimpull pressure and impeller clutch torque are selected based on the non-digging application and the impeller clutch pedal displacement. A second curve 110 in FIGS. 3 and 4 may represent the non-digging situation.

With reference to FIGS. 3 and 4, curve 110 may represent the situation described above, where machine 10 is operating at a set speed while performing a non-digging application. Curve 110 is selected by the controller 42 when the controller 42 determines that the machine 10 is performing a non-digging application. The application is determined by the controller 42 as described above in reference to a digging application. For example, when the machine 10 is performing a non-digging application, the machine tool 22 may not be in a digging position, i.e., the machine tool 22 is above a reference line. Controller 42 determines if the conditions for a digging application have occurred, then selects curve 110 if the controller indicates the machine 10 is performing a non-digging application. Based on curve 110, during non-digging applications the controller 42 communicates with the transmission 16 to change the rimpull pressure based on the torque desired by curve 110 and the impeller clutch pedal 34 travel (referring to FIGS. 3 and 4).

As can be seen from curve 110, before impeller clutch pedal 34 is depressed, the actuating pressure of impeller clutch 26 may be at a maximum value (referring to FIG. 3), the Full-on pressure. In this state, slip of impeller clutch 26 may be minimized and substantially all of the torque produced by power source 12 and transmitted to impeller clutch 26 may be transferred to traction devices 18 (referring to FIG. 4). As impeller clutch pedal 34 is depressed through the deadband (e.g. through the first 6% of its range of motion), little change in the actuating pressure can be observed (FIG. 3). However, as the position of impeller clutch pedal 34 reaches the displaced boundary of the deadband, the actuating pressure of impeller clutch 26 may quickly drop from the Full-on pressure to a Roll-off pressure specific to the current speed of power source 12. At the Roll-off pressure, slippage of impeller clutch 26 should still be substantially inhibited and the torque transferred to traction devices 18 substantially unchanged (FIG. 4).

As impeller clutch pedal 34 is depressed past the displaced boundary of the deadband, a reduction in the torque transmitted through to traction devices 18 may be experienced. That is, as impeller clutch pedal 34 is depressed further from about the 6% displaced position to the maximum displaced position, the actuating pressure of impeller clutch 26 may be reduced between the Roll-off pressure and a Dump pressure at a rate corresponding to the current displacement position of impeller clutch pedal 34 (FIG. 3). In one example, the rate of change in actuating pressure over the change in impeller clutch pedal position may change over the range during a non-digging application. As shown in FIG. 4, in the high torque range on curve 110 there is a rapid change in torque (slope of curve 110), and in the low torque range there was a gradual change in torque (slope of 110). This allows for the operator to have more control over the modulation of the torque transmitted to the traction devices 18 in the low torque range before braking during the non-digging application. The maximum torque reduction may be experienced at about 50% travel of impeller clutch pedal 34 (FIG. 4). As impeller clutch pedal 34 is depressed past the 50% displacement position the pressure may be reduced further to the Dump pressure and the brake mechanism may be activated. The Dump pressure may be a minimum allowable pressure that, when combined with brake pressure, may help ensure machine 10 is inhibited from rolling freely (i.e., some positive torque may always be transferred to traction devices 18 when transmission 16 is engaged). The Dump pressure may also keep impeller clutch 26 full of pressurized fluid for quick activation when commanded. As can be seen from FIG. 4, when impeller clutch pedal 34 is displaced past the 50% displacement position, the torque output may remain substantially the same for both machine applications.

These relationships for digging and non-digging applications may be stored within the map of controller 42 and referenced during machine operation. The controller 42 may constantly monitor and classify the current machine application, i.e., digging and non-digging. As the impeller clutch pedal 34 is depressed by an operator, the controller 42 selects the appropriate rimpull pressure curve based on the machine application indicated by the controller 42. Controller 42 then controls the pressure along the appropriate torque output/pedal position curve, as shown in curves 100 and 110.

Several advantages may be realized by the disclosed control system. Specifically, because the actuating pressure inhibiting impeller clutch slippage may be reduced as the amount of torque transmitted through the impeller clutch is reduced, the impeller clutch pedal may maintain consistent and responsive performance for any machine application. And, because the system may adjust modulation of the impeller clutch automatically, the burden on the operator may remain unchanged or even be reduced. Further, because the system may function with few complex calculations or stored performance curves, it may be simple and inexpensive.

It will be apparent to those skilled in the art that various modifications and variations can be made to the disclosed machine control system. Other embodiments will be apparent to those skilled in the art from consideration of the specification and practice of the disclosed machine control system. It is intended that the specification and examples be considered as exemplary only, with a true scope being indicated by the following claims and their equivalents.

What is claimed is:

1. A machine control system for use with a machine having a power source and a transmission, the machine control system comprising:
   a clutch configured to connect an output of the power source with an input of the transmission;
   a plurality of sensors configured to generate signals indicative of current operations of the machine;
   an operator input device configured to indicate an operator desired reduction in an amount of torque transferred from the power source to the transmission; and
   a controller in communication with the clutch, the operator input device, and the sensors, the controller being configured to determine a current machine application based on the signals, and being configured to vary an actuating force of the clutch based on the current machine application and a displacement of the operator input device such that a same displacement of the operator input device during different machine applications results in different actuating forces of the clutch,
   wherein the actuating force is reduced as a value of the input increases from a deadband where substantially no change in the actuating force is affected toward a maximum displaced position;
   as the value of the input increases directly after the deadband, the actuating force varies at a slower rate during a digging application than a non-digging application; and
   as the value of the input approaches the maximum displaced position, the actuating force varies at a slower rate during the non-digging application than the digging application.

2. The machine control system of claim 1, wherein the controller is configured to receive a machine tool position signal, a travel speed signal, and a transmission control signal, and is configured to determine whether the machine is performing one of a digging and non-digging application, and is configured to responsively determine a required torque and the actuating force for the current machine application.

3. The machine control system of claim 1, wherein the operator input device is movable through a range from a neutral position to the maximum displaced position, and the range includes the deadband where substantially no change in the actuating force is affected.

4. The machine control system of claim 3, wherein the deadband includes a portion of the range from the neutral position to about 6% of the maximum displaced position.

5. The machine control system of claim 3, wherein when the operator input device is moved to a displaced position outside of the deadband, the actuating force is changed to a level related to the displaced position and to the current machine application.

6. The machine control system of claim 5, wherein the relationship between the change in the actuating force and the displaced position is substantially linear when the current machine application is a digging application.

7. The machine control system of claim 5, wherein the actuating force is maintained above a minimum engagement force of the clutch.

8. The machine control system of claim 1, wherein the plurality of sensors include at least one each of a travel speed sensor, a machine tool position sensor, and a transmission sensor.

9. The machine control system of claim 1, wherein the machine applications determined by the controller are one of a digging and non-digging application.

10. The machine control system of claim 1, wherein the controller includes a digital filter.

11. The machine control system of claim 1, wherein the clutch is an impeller clutch, and is part of a torque converter.

12. A method of operating a machine, comprising:
   generating power;
   engaging a coupling to transmit the power to move the machine;
   determining a current machine application;
   receiving an input indicative of an operator desired reduction in an amount of power transmitted to propel the machine; and
   varying the engagement of the coupling based on the current application and the input such that a same input results in a different engagement of the coupling in different machine applications,
   wherein the engagement is reduced as a value of the input increases from a deadband where substantially no change in the engagement is affected toward a maximum reduction value;

as the value of the input increases directly after the deadband, the engagement of the coupling varies at a slower rate during a digging application than a non-digging application; and as the value of the input approaches the maximum reduction value, the engagement of the coupling varies at a slower rate during the non-digging application than the digging application.

13. The method of claim 12, wherein the input includes a range from a neutral value to the maximum reduction value, and the range includes the deadband.

14. The method of claim 13, wherein:

when the input is outside of the deadband, the engagement is varied to a level related to a value of the input and to the current machine application.

15. The method of claim 12, wherein the current machine application determined is one of a digging and non-digging application.

16. The method of claim 15, wherein determining whether the machine is digging includes:

determining whether the transmission is engaged in a predetermined gear and direction;

determining whether a machine tool is at a digging position; and determining whether a machine travel speed is less than a predetermined speed.

17. A machine, comprising:

an engine coupled through a torque converter to a transmission;

a clutch configured to connect an output of the power source with an input of the torque converter;

a clutch control device configured to control engagement of the clutch when the clutch control device is depressed by an operator;

sensors configured to generate signals indicative of current operations of the machine; and a controller in communication with the sensors, the clutch control device, and the clutch, the controller being configured to determine a current machine application based on the signals, and being configured to vary engagement of the clutch based on the current machine application and a displacement of the clutch control device, such that a same positive amount of displacement of the clutch control device during different machine applications results in different engagements of the clutch, wherein the engagement is reduced as a value of the input increases from a deadband where substantially no change in the engagement is affected toward a maximum reduction value;

as the value of the input increases directly after the deadband, the engagement varies at a slower rate during a digging application than a non-digging application; and as the value of the input approaches the maximum reduction value, the engagement varies at a slower rate during the non-digging application than the digging application.

18. The machine of claim 17, wherein the machine applications determined by the controller are one of a digging and non-digging application.

* * * * *